(12) United States Patent
Xu et al.

(10) Patent No.: US 9,118,526 B2
(45) Date of Patent: Aug. 25, 2015

(54) METHOD AND APPARATUS FOR CONTROLLING DATA STORAGE

(75) Inventors: Xiangyang Xu, Shenzhen (CN); Guangyu Shi, Santa Clara, CA (US); Hongbo Zhang, Shenzhen (CN); Liufei Wen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 477 days.

(21) Appl. No.: 13/588,389

(22) Filed: Aug. 17, 2012

(65) Prior Publication Data

US 2012/0311268 A1      Dec. 6, 2012

Related U.S. Application Data

(63) Continuation of application No. PCT/CN2011/074116, filed on May 16, 2011.

(30) Foreign Application Priority Data

Oct. 11, 2010   (CN) .......................... 2010 1 0512511

(51) Int. Cl.
*G06F 12/00* (2006.01)
*H04L 29/08* (2006.01)
*G06F 12/08* (2006.01)

(52) U.S. Cl.
CPC ...... *H04L 29/08729* (2013.01); *G06F 12/0893* (2013.01)

(58) Field of Classification Search
CPC ....................... H04L 29/08729; G06F 12/0893
USPC ......................................................... 711/126
See application file for complete search history.

(56) References Cited

U.S. PATENT DOCUMENTS

| 2003/0074364 A1* | 4/2003 | Sewall et al. ................. 707/101 |
| 2003/0093544 A1* | 5/2003 | Richardson .................. 709/231 |
| 2010/0274760 A1 | 10/2010 | Diot et al. |

FOREIGN PATENT DOCUMENTS

| CN | 1658560 | 8/2005 |
| CN | 101751309 | 6/2010 |

(Continued)

OTHER PUBLICATIONS

PCT Written Opinion of the International Searching Authority mailed Aug. 25, 2011 in corresponding International Application No. PCT/CN2011/074116.

(Continued)

*Primary Examiner* — Aracelis Ruiz
(74) *Attorney, Agent, or Firm* — Staas & Halsey LLP (57) ABSTRACT

Disclosed are a method and an apparatus for controlling data storage. The method includes: obtaining the number of copies of to-be-placed media content; inputting user set information, server set information, media traffic demand information, and network topology information that are collected into a joint optimization model that is based on server selection and traffic engineering to perform joint optimization, and obtaining output information; performing statistics collection on the output information to obtain user access statistics of the to-be-placed media content on each cache device; and placing, according to the user access statistics of the media content and the number of copies, the copies of the to-be-placed media content so that the copies of the to-be-placed media content are preferentially placed on a cache device having large user access statistics. Embodiments of the present invention also provide an apparatus for controlling data storage.

7 Claims, 5 Drawing Sheets

(56) References Cited

FOREIGN PATENT DOCUMENTS

| CN | 101753625 | 6/2010 |
| CN | 101800768 | 8/2010 |
| WO | WO 2009/074558 | 6/2009 |

OTHER PUBLICATIONS

Chinese Office Action mailed Jul. 1, 2013 in corresponding Chinese Application No. 201010512511.3.

Wenjie Jiang et al., "Cooperative Content Distribution and Traffic Engineering in an ISP Network", *SIGMETRICS/Performance '09*, Jun. 15-19, 2009, pp. 1-12.

Ho-Shing Tang et al., "Optimizing Segment Caching for Peer-To-Peer On-Demand Streaming", 2009, pp. 810-813.

International Search Report of PCT/CN2011/074116 mailed Aug. 25, 2011.

First Chinese Office Action issued Oct. 10, 2012 in corresponding Chinese Patent Application No. 201010512511.3.

Partial English Translation of Chinese Reference No. 101800768, published Aug. 11, 2010 (of record).

* cited by examiner

METHOD AND APPARATUS FOR CONTROLLING DATA STORAGE

CROSS-REFERENCE TO RELATED APPLICATIONS

This application is a continuation of International Application No. PCT/CN2011/074116, filed on May 16, 2011, which claims priority to Chinese Patent Application No. 201010512511.3, filed on Oct. 11, 2010, both of which are hereby incorporated by reference in their entireties.

FIELD OF THE INVENTION

The present invention relates to the computer field, and in particular, to a method and an apparatus for controlling data storage.

BACKGROUND OF THE INVENTION

Research on Internet traffic conducted by various network companies and authorities shows that media content will take up 90% of the total Internet traffic in the future. Therefore, effectively storing and accessing the media content is a critical and hot issue in network technology research.

An economic way of storing the media content to meet the demands of large numbers of users is to use a high speed cache (cache mechanism, that is, copies of the media content are cached on cache devices having the storage function). The cache devices are generally distributed over the network. When a user requests the media content, the user only needs to access one or multiple cache devices storing the media content.

One problem is presented during using of the cache mechanism, that is, on which cache devices the copies of the media content are to be placed. Concerning this problem, the prior art proposes the following solution:

The cache devices on which the copies are to be placed are selected by minimizing the physical distance between the locations for placing the copies. This solution predicts, according to the popularity of the copies, the number of copies to be placed to balance the supply and the demand, and then selects several cache devices close to each other in terms of the physical location to place the copies.

However, the technical solutions in the prior art has the following problems:

In the prior art, the cache devices on which the copies are to be placed are selected by minimizing the physical distance between the locations for placing the copies and copies of the media content are placed on these cache devices. In practice, it is probable that no copies are placed on cache devices that are frequently accessed by users, and consequently users need to transit to other cache devices for accessing the copies, causing a longer delay when users access the media content.

Or, it is possible that copies of the media content are placed on cache devices that are seldom accessed by users. Consequently, an access rate of the copies is low, affecting storage space of the cache devices.

SUMMARY OF THE INVENTION

Embodiments of the present invention provide a method and an apparatus for controlling data storage, which are capable of reducing the average delay in user access and improving the utilization rate of a network.

An embodiment of the present invention provides a method for controlling data storage, including: obtaining the number of copies of to-be-placed media content; inputting user set information, server set information, media traffic demand information, and network topology information that are collected into a joint optimization model that is based on server selection and traffic engineering to perform joint optimization, and obtaining output information; performing statistics collection on the output information to obtain user access statistics of the to-be-placed media content on each cache device; and placing, according to the user access statistics and the number of copies, the copies of the to-be-placed media content so that the copies of the to-be-placed media content are preferentially placed on a cache device having large user access statistics.

An embodiment of the present invention provides an apparatus for controlling data storage, including: an information collecting module, configured to obtain the number of copies of to-be-placed media content and collect user set information, server set information, network topology information, and a media content demand; a joint optimization module, configured to input user set information, server set information, media traffic demand information, and network topology information that are collected into a joint optimization model that is based on server selection and traffic engineering to perform joint optimization, and obtain output information; a statistics calculating module, configured to perform statistics collection on the jointly optimized output information to obtain user access statistics of the to-be-placed media content on each cache device; and a copy placing module, configured to place, according to the user access statistics and the number of copies, the copies of the to-be-placed media content so that the copies of the to-be-placed media content are preferentially placed on a cache device having large user access statistics.

It can be seen from the above technical solutions that the embodiments of the present invention have the following advantages:

In the embodiments of the present invention, joint optimization is performed for the network information by using a joint optimization model based on server selection and traffic engineering, statistics collection is performed for the jointly optimized output information to obtain the user access statistics of the media content, and the copies are placed according to the user access statistics so that the copies of the to-be-placed media content are preferentially placed on the cache device having large user access statistics. Therefore, it is ensured that the cache device having large user access statistics is placed with copies of the media content for ease of user access. In this way, users do not need to access another cache device in transit mode, and therefore the average delay in user access may be shortened.

In addition, no copy of the media content generally is placed on a cache device with small user access statistics. Therefore, its storage space may be saved and the network utilization rate is effectively improved.

DETAILED DESCRIPTION OF THE EMBODIMENTS

Embodiments of the present invention provide a method and an apparatus for controlling data storage for placing copies of media content, which are capable of achieving optimized delay experience and improving the network utilization rate.

Figure 1:
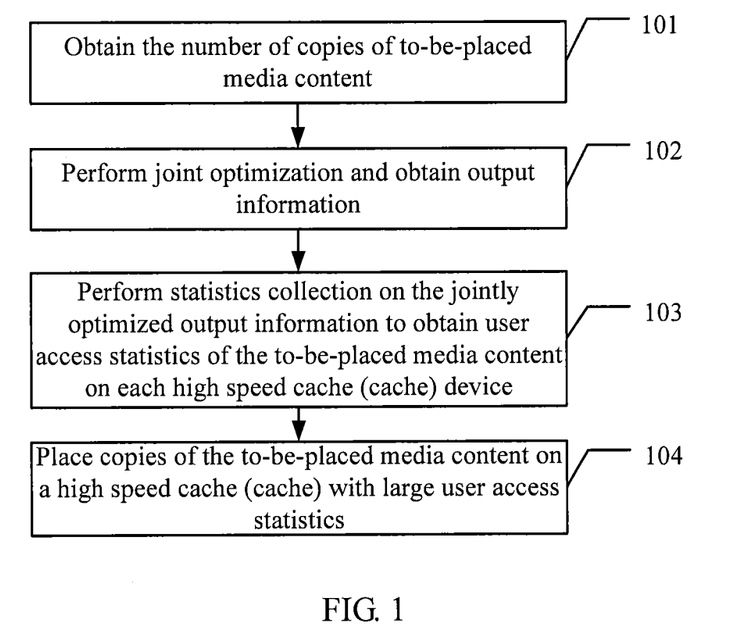
FIG. 1 is a schematic diagram of a method for controlling data storage according to an embodiment of the present invention.

Referring to FIG. 1, an embodiment of a method for controlling data storage according to the present invention is illustrated, including:

101. Obtain the number of copies of to-be-placed media content.

In this embodiment, to meet demands for the media content from a large number of users, an apparatus for controlling data storage may cache the copies of the media content on a cache device having a storage function.

The number of the copies of the media content may be determined according to the popularity of the media content. In practice, the number of the copies of the media content may also be determined according to other factors, which are common knowledge for those skilled in the art and are not limited here.

102. Perform joint optimization and obtain output information.

In this embodiment, the apparatus for controlling data storage may input user set information, server set information, media traffic demand information, and network topology information that are collected into a joint optimization model that is based on server selection and traffic engineering to perform joint optimization, and obtain jointly optimized output information.

It should be noted that, in the field of network optimization, server selection optimization and traffic engineering optimization are two different optimization issues in the network optimization research. In the prior art, a server selection optimization model and a traffic engineering optimization model are established.

The optimization model based on server selection and traffic engineering refers to an optimization model combining the server selection optimization model and the traffic engineering optimization model, and meanwhile combining the convex optimization technology and the Nash Bargaining Solution in the Game Theory. The specific optimization model is the common knowledge for those skilled in the art, which is not limited here.

103. Perform statistics collection on the jointly optimized output information to obtain user access statistics of the to-be-placed media content on each cache device.

After the output information is obtained after joint optimization is performed on the user set information, the server set information, the media traffic demand information, and the network topology information, statistics collection may be performed on the output information to obtain the user access statistics of the to-be-placed media content on each cache device.

104. Place the copies of the media content on a cache device with large user access statistics.

The apparatus for controlling data storage places, on the corresponding cache device according to the user access statistics obtained in step 103 and the number of copies obtained in step 101, the copies of the to-be-placed media content so that the copies of the to-be-placed media content are placed on the cache device with large user access statistics of the to-be-placed media content.

In this embodiment, joint optimization is performed on the network information by using a joint optimization model based on server selection and traffic engineering, statistics collection is performed on the jointly optimized output information to obtain the user access statistics of the media content, and the copies are placed according to the user access statistics so that the copies of the to-be-placed media content are preferentially placed on the cache device with large user access statistics. Therefore, it is ensured that the cache device with large user access statistics is placed with copies of the media content, being ease of user access. In this way, users do not need to access another cache device in transit mode, and therefore the average delay in user access may be shortened.

In addition, no copy of the media content is placed on a cache device with small user access statistics is placed. Therefore, its storage space may be saved and the network utilization rate is effectively improved.

Figure 2:
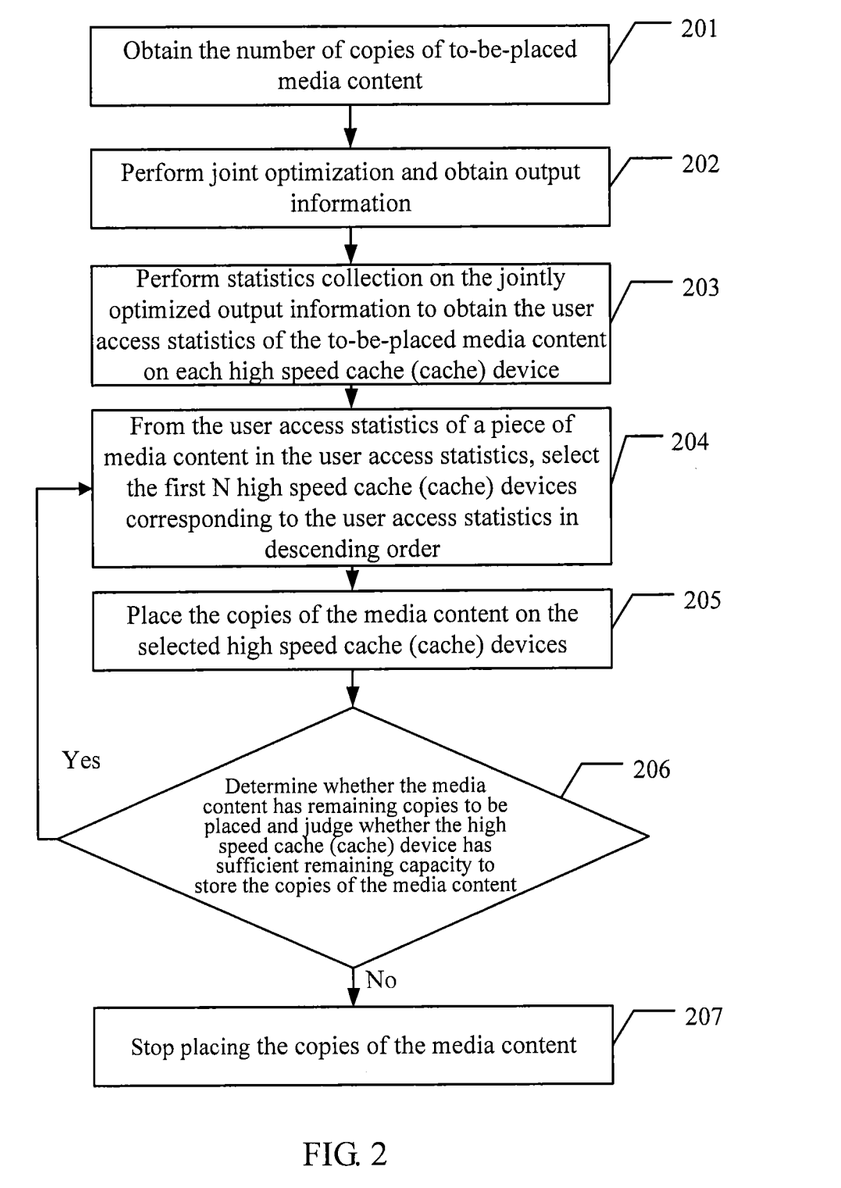
FIG. 2 is another schematic diagram of a method for controlling data storage according to an embodiment of the present invention.

For ease of understanding, the following describes in detail the method for controlling data storage according to the embodiments of the present invention. For details, refer to FIG. 2. A method for controlling data storage according to another embodiment of the present invention includes:

201. Obtain the number of copies of to-be-placed media content.

Step 201 is the same as step 101 in the embodiment illustrated in FIG. 1, which is not detailed here again.

202. Input user set information, server set information, media traffic demand information, and network topology information that are collected into a joint optimization model that is based on server selection and traffic engineering to perform joint optimization, and obtain jointly optimized output information.

The jointly optimized output information may include the user set information, the server set information, the media traffic demand information, and the network topology information, and other information such as a server bandwidth set and network end-to-end background traffic information. In practice, the server bandwidth set or other information may be added to the input information for joint optimization according to the actual requirement, which is not limited here.

The jointly optimized output information includes a cache device policy and a network routing policy. The cache device policy includes a policy of a cache device providing services for user selection and a traffic allocation policy of the cache device; and the network routing policy includes a policy for selecting a route between the cache device and a user.

203. Perform statistics collection on the jointly optimized output information to obtain user access statistics of the to-be-placed media content on each cache device.

In this embodiment, during the statistics collection on the jointly optimized output information, the cache device policy in the output information is mainly collected. The cache device policy includes the policy of the cache device providing services for user selection, where the policy of the cache device providing services for user selection may include correspondence between the user, the media content accessed by the user, and the cache device storing the media content. Statistics collection may be performed on user access statistics of each piece of media content on each cache device according to the correspondence to obtain user access statistics of the to-be-placed media content on each cache device.

In practice, the statistics collection of the user access statistics may focus on different aspects. To be specific, only the frequency of accessing the media content by the user may be collected, or the frequency of accessing the media content by the user and traffic between the server and the user may be collected. Therefore, the statistical information of the user access statistics may be determined according to the actual requirement, which is not limited here.

In this embodiments of the present invention, a set matrix U of the user access statistics of all pieces of to-be-placed media content may be obtained after statistics collection is performed on the jointly optimized output information.

204. From user access statistics of a certain piece of media content in the user access statistics, select cache devices corresponding to the first N user access statistics in descending order.

205. Place the copies of the media content on the selected cache devices.

The user access statistics U include the user access statistics of all pieces of the to-be-placed media content that correspond to each device. When the copies are placed on the cache devices, select the user access statistics of a piece of media content on each cache device from the user access statistics U, sequence the user access statistics of the media content in descending order, and select cache devices corresponding to the first N user access statistics to place the copies of the media content, where N is the number of the copies of the media content, and the number of selected cache devices is the same as the number of the copies of the media content.

206. Determine whether the media content has remaining copies to be placed and determine whether the cache devices have sufficient remaining capacity to store the copies of the media content; if the remaining capacity is sufficient, perform step 204; otherwise, perform step 207.

207. Stop placing the copies of the media content.

When no remaining copies of the media content need to be placed, or the cache devices do not have sufficient remaining capacity to store any copy of the media content, placing the copies of the media content is stopped.

When some copies of the media content still need to be placed, and the remaining capacity of the cache devices is larger than the capacity required for placing the copies of the media content, user access statistics of a next piece of to-be-placed media content in the user access statistics U are sequenced, and the copies of the next to-be-placed media content are placed to ensure the copies of all pieces of the to-be-placed media content are placed completely; or when the cache devices do not have insufficiency remaining capacity to store any copy of the media content, placing the copies of the media content is stopped.

Figure 3:
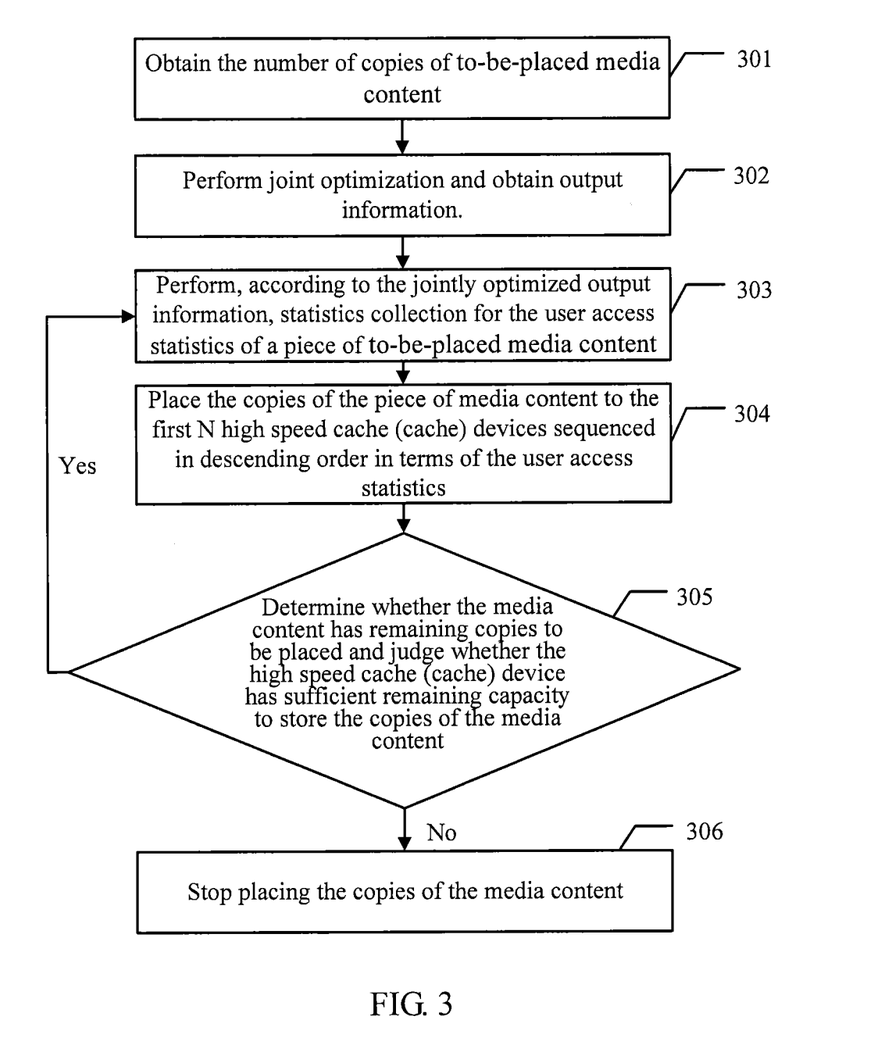
FIG. 3 is another schematic diagram of a method for controlling data storage according to an embodiment of the present invention.

The embodiment illustrated in FIG. 2 describes placing of the copies of a piece of media content after user access statistics collection is performed for all pieces of the to-be-placed media content. In practice, other manners for placing copies may also be used. Referring to FIG. 3, a method for controlling data storage according to another embodiment of the present invention includes:

301-302. The steps are the same as steps 201 and 202 in the embodiment illustrated in FIG. 2, which are not detailed here again.

303. Perform statistics collection according to the jointly optimized output information to obtain user access statistics of a piece of to-be-placed media content.

In this embodiment of the present invention, statistics collection is performed on the jointly optimized output information multiple times. After each time of statistics collection, user access statistics of only one piece of to-be-placed media content is obtained.

304. Place the copies of the piece of media content to the first N cache devices sequenced in descending order in terms of the user access statistics.

The user access statistics of the piece of media content are sequenced in descending order, and cache devices corresponding to the first N user access statistics are selected to place the copies of the piece of media content. By performing steps 303 and 304, the copies of one piece of media content are placed completely.

305. Determine whether the media content has remaining copies to be placed and determine whether the cache devices have sufficient remaining capacity to store the copies of the media content; if the remaining capacity is sufficient, perform step 303; otherwise, perform step 306.

306. Stop placing the copies of the media content.

When some copies of the media content still need to be placed, and the remaining capacity of the cache devices is larger than the capacity required for placing the copies of the media content, statistics collection is still performed on the jointly optimized output information, user access statistics of a next piece of to-be-placed media content are obtained and sequenced, and the copies of the next piece of to-be-placed media content are placed to ensure the copies of all the to-be-placed media content are placed completely; or when the cache devices do not have insufficiency remaining capacity to store any copy of the media content, placing the copies of the media content is stopped.

The embodiment illustrated in FIG. 2 is different from the embodiment illustrated in FIG. 3 in that: according to the embodiment illustrated in FIG. 2, statistics collection is performed on the jointly optimized output information only once to obtain the user access statistics matrix U; whereas according to the embodiment illustrated in FIG. 3, statistics collection is performed on the jointly optimized output information multiple times, user access statistics of only one piece of media content is obtained each time, and after the copies of the piece of media content are placed completely, user access statistics collection and copy placement are performed for a next piece of media content.

Figure 4:
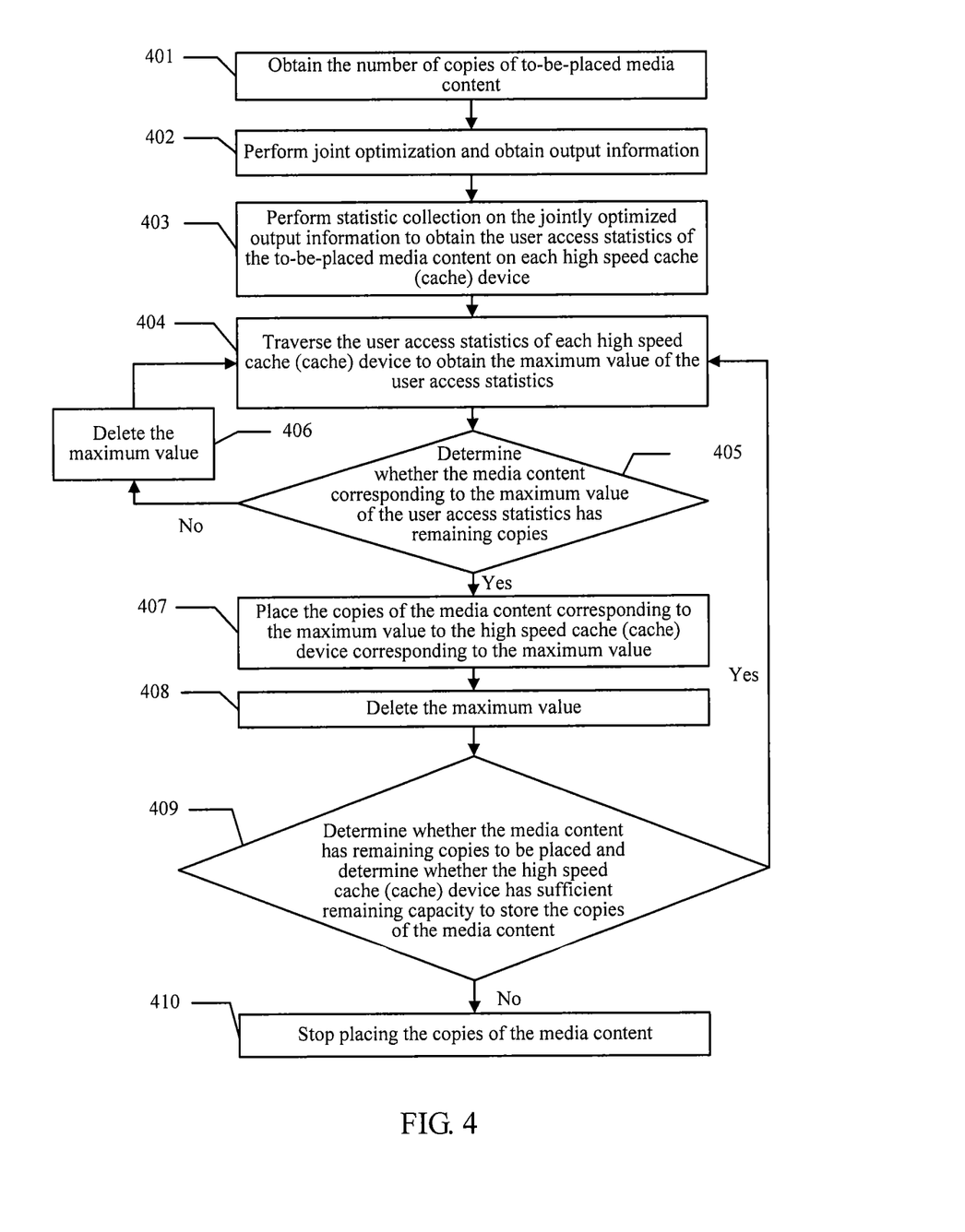
FIG. 4 is another schematic diagram of a method for controlling data storage according to an embodiment of the present invention.

In practice, besides the data storage methods described in the embodiments illustrated in FIG. 2 and FIG. 3, another method for controlling data storage is also available. Referring to FIG. 4, a data storage method according to another embodiment of the present invention includes:

401-403. The steps are the same as steps 201 to 203 in the embodiment illustrated in FIG. 2, which are not detailed here again.

404. Traverse user access statistics of each cache device to obtain the maximum value of the user access statistics.

The user access statistics matrix U of each cache device includes the corresponding user access statistics of all to-be-placed media content on the each cache device. After the matrix U is traversed, the maximum value of the user access statistics is obtained.

405. Determine whether the media content corresponding to the maximum value of the user access statistics has remaining copies; if the media content does not have remaining copies, perform step 406; otherwise, perform step 407.

406. Delete the maximum value and continue to perform step 404.

407. Place the copies of the media content corresponding to the maximum value to the cache device corresponding to the maximum value.

408. Delete the maximum value.

409. Determine whether the media content has remaining copies to be placed and determine whether the cache device has sufficient remaining capacity to store the copies of the media content; if the remaining capacity is sufficient, perform step 404; otherwise, perform step 410.

410. Stop placing the copies of the media content.

It should be noted that, this embodiment of the present invention describes the case where there is only one maximum value of the user access statistics. However, the case that there are multiple maximum values may also exist. In such a case, copies of the media content may be placed on the cache devices corresponding to the maximum values randomly or may be placed on cache devices according to the priorities of the cache devices or pieces of media content. In practice, the method for placing the copies in the case of multiple maximum values of the user access statistics may depend on specific situations, which is not limited here.

In this embodiment of the present invention, the user access statistics of the cache devices are traversed to obtain the maximum value of the access statistics, and the copies are placed according to the media content and cache device that correspond to the maximum value.

For a better understanding, the following describes specific application scenarios of the embodiments. For ease of description, the used symbols are defined as follows:

$B=\{b_j|1\le j\le M|\}$ indicates a set of all to-be-placed media content, and the storage space occupied by the media content $b_j$ is sizeof($b_j$); $R=\{r_j|1\le j\le M|\}$ is a set of the numbers of the copies of the media content, where $r_j$ indicates the number of copies of the media content $b_j$; $S=\{s_i|1\le i\le N|\}$ is a set of cache devices, where $s_j$ indicates a set of the cache devices selected for placing the copies of the media content $b_j$; $C=\{c_i|1\le i\le N|\}$ is a set of idle storage capacity of the cache devices, where $c_j$ indicates the idle storage capacity of the cache devices $s_j$; $BW=\{bw_i|1\le i\le N|\}$ is a set of bandwidth of the cache devices; $T=\{t_j|1\le k\le K|\}$ is a set of all users; $m_k$ is the content traffic demand of the user $t_k$; $bg_{ki}$ is the end-to-end background traffic from the user $t_k$ to the cache devices $s_j$; the matrix $U=\{u_{ij}|1\le i\le N,1\le j\le M|\}$ is a two-dimensional matrix of the user access statistics, where $u_{ij}$ indicates the user access statistics of the media content $b_j$ on the cache devices $s_j$. In addition, the definition of the set $S_{valid}^k$ of the cache devices that can be accessed by users is as follows: assume that media content $b_j$ is accessed by the user $t_k$; if the copies of $b_j$ have been displaced on the set $s_j$ of the cache devices, then $S_{valid}^k=s_j$; otherwise, $S_{valid}^k=\{s_i|s_i\in S,c_i\ge sizeof(b_j)\}$. The above various sets are initialized to obtain the information required for joint optimization. The user set information T, cache device set information S, media traffic demand information $m_k$, and network topology information BW and $bg_{ki}$ are input into a joint optimization model based on server selection and traffic engineering and statistics collection is performed on the output information to obtain the user access statistics.

The method for calculating the user access statistics is as follows: assume that the user set served by the cache device s is $T_s$, and the collected user access statistics of the media content b on the cache device s is $$\sum_{t\in T_s} I^{tb} \times x^{st}.$$

When the user t does not access the media content b, $I^{tb}=0$; when the user t accesses the media content b, $I^{tb}=1$. $x^{st}$ indicates the traffic between the cache device s and the user t. It should be noted that the focus of the user access statistics varies with optimization requirements. When statistics collection needs to be performed only on the user's access frequency rather than the traffic, the user access statistics is $$\sum_{t\in T_s} I^{tb}.$$

In practice, the formula for collecting the user access statistics is set as required, which is not limited here.

The following describes specific applications corresponding to the embodiments illustrated in FIG. 2, FIG. 3, and FIG. 4.

Corresponding to the method described in the embodiment illustrated in FIG. 2:

Statistics collection is performed on the jointly optimized output information to obtain a two-dimensional matrix U, $U=\{u_{ij}|1\le i\le N,1\le j\le M|\}$, where $u_{ij}$ indicates the user access statistics of the media content $b_j$ on the cache devices $s_j$. In practice, the matrix U may be or not be generated according to actual requirements, and the form of the matrix may also be determined according to actual requirements, which are not limited here.

The copies of the media content $b_j$ are placed, the user access statistics of the media content $b_j$ are sequenced in descending order according to the matrix U, and the first $r_j$ cache devices corresponding to the user access statistics are selected for placing the copies of the media content $b_j$. After the copies of the media content $b_j$ are placed completely, the idle capacity of the cache devices allocated to the media content $b_j$ is reduced by sizeof($b_j$). Cache device selection and copy placement are performed for the media content $b_{j+1}$ until all the cache devices have no sufficient remaining capacity to store any copy of any media content or the copies of all media content are placed to the corresponding cache devices.

Corresponding to the method described in the embodiment illustrated in FIG. 3:

When statistics collection is performed on the jointly optimized output information, the matrix U may be directly obtained. However, the copies of one piece of media content are placed each time after the user access statistics of the media content are collected, and then the user access statistics of the copies of a next piece of media content are collected.

Statistics collection is performed on the jointly optimized output information to obtain the user access statistics of the media content $b_j$, the user access statistics of the media content $b_j$ are sequenced in descending order, and the first $r_j$ cache devices corresponding to the user access statistics are selected for placing the copies of the media content $b_j$. After the copies of the media content $b_j$ are placed completely, the idle capacity of the cache devices allocated to media content $b_j$ is reduced by sizeof($b_j$). Cache device selection and copy placement are performed for the media content $b_{j+1}$ until all the cache devices have no sufficient remaining capacity to store any copy of any piece of media content or the copies of all media content are placed to the corresponding cache devices.

Corresponding to the method described in the embodiment illustrated in FIG. 4:

Statistics collection is performed on the jointly optimized output information to obtain the two-dimensional matrix U of the user access statistics. The matrix U is traversed to obtain the maximum value $u_{ij}$ of the user access statistics, where $u_{ij}$ indicates the user access statistics of the media content $b_j$ on the cache devices $s_i$. It is determined whether the media content $b_j$ has remaining copies to place. If the media content $b_j$ has remaining copies to place, the copies of the media content b corresponding to the maximum value $u_{ij}$ are placed to the corresponding cache devices $s_i$, the maximum value is deleted from the matrix U, and the matrix U is further traversed to obtain a next maximum value. If the media content $b_j$ does not have remaining copies to place, the maximum value of the user access statistics is deleted from the matrix U, and the matrix U is further traversed to obtain a next maximum value of the user access statistics. In this case, similar determination is made to ensure that the remaining capacity of all the cache devices is insufficient to store any copy of the media content or the copies of all pieces of media content have been placed on the corresponding cache devices completely.

In the embodiments, joint optimization is performed on the network information, statistics collection is performed on the jointly optimized output information, and copies are placed according to the user access statistics so that the copies of the media content are preferentially placed on the cache device with large user access statistics. In this way, a user is provided with optimized delay experience when accessing the media content, and less network traffic is generated. This improves the user's delay experience and mitigates network congestion.

Figure 5:
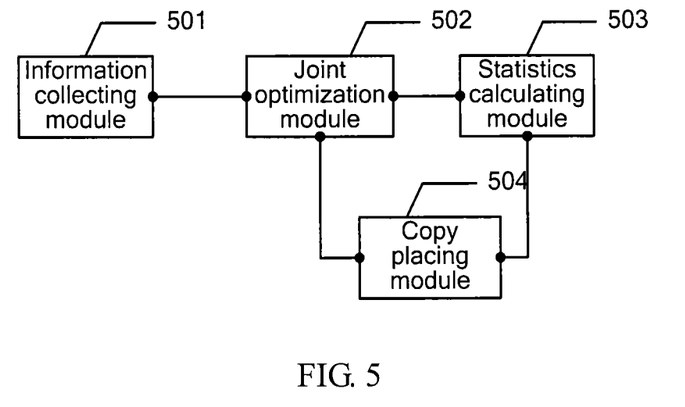
FIG. 5 is a schematic diagram of an apparatus for controlling data storage according to an embodiment of the present invention.

The following describes an apparatus for controlling data storage for placing copies according to an embodiment of the present invention. Referring to FIG. 5, the apparatus for controlling data storage according to this embodiment includes:

an information collecting module 501, configured to obtain the number of copies of to-be-placed media content and collect user set information, server set information, network topology information, and media content demand;

a joint optimization module 502, configured to input the user set information, server set information, media traffic demand information, and network topology information that are collected into a joint optimization model that is based on server selection and traffic engineering to perform joint optimization, and obtain jointly optimized output information;

a statistics calculating module 503, configured to perform statistics collection on the jointly optimized output information to obtain user access statistics of the media content on each cache device; and a copy placing module 504, configured to place, according to the user access statistics of the media content and the number of copies, the copies of the to-be-placed media content so that the copies of the to-be-placed media content are preferentially placed on a cache device with large user access statistics.

In this embodiment, the statistics calculating module 503 may specifically include:

a parsing unit, configured to parse a policy of a cache device providing services for user selection to obtain correspondence between a user, media content accessed by the user, and a cache device storing the media content, where the policy of the cache device providing services for user selection is contained in a cache device policy and the cache device policy is contained in the output information;

a statistics collecting unit, configured to collect user access statistics of each piece of media content on each cache device; and an obtaining unit, configured to obtain user access statistics of to-be-placed media content on each cache device.

In this embodiment, the information collecting module 501 inputs the user set information, server set information, media traffic demand information, and network topology information that are collected into the joint optimization module 502. The joint optimization module 502 performs joint optimization by using the joint optimization model based on the server selection and traffic engineering and sends the output information to the statistics calculating module 503. The statistics calculating module performs statistics collection according to the number of the copies of the to-be-placed media content that is obtained by the information collecting module 501 and the information sent by the joint optimization module 502. The user access statistics obtained by the statistics calculating module 503 are sent to the copy placing module 504. The copy placing module 504 obtains the first N cache devices when the user access statistics corresponding to media content are sequenced in descending order and places the copies of the media content to the first N cache devices so that the copies of the to-be-placed media content are preferentially placed on the cache device with large user access statistics.

Figure 6:
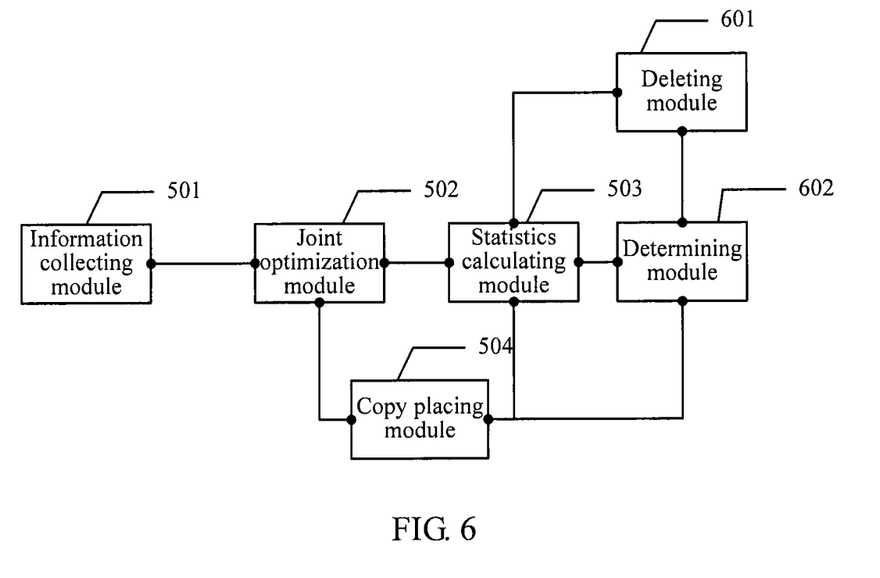
FIG. 6 is another schematic diagram of an apparatus for controlling data storage according to an embodiment of the present invention.

FIG. 6 is another schematic diagram of an apparatus for controlling data storage according to an embodiment of the present invention.

In this embodiment, the information collecting module 501, the joint optimization module 502, the statistics calculating module 503, and the copy placing module 504 are the same as those described in the embodiment illustrated in FIG. 5, which are not detailed here.

The embodiment illustrated in FIG. 6 further includes:

a deleting module 601, configured to delete the maximum value of the user access statistics when the media content corresponding to the maximum value of the user access statistics does not have remaining copies; and a determining module 602, configured to determine whether the media content corresponding to the maximum value of the user access statistics has remaining copies.

When the copies are placed according to the embodiment illustrated in FIG. 4, the deleting module 601 and the determining module 602 are also used. The information collecting module 501 inputs the user set information, service set information, media traffic demand information, and network topology information that are collected into the joint optimization module 502. The joint optimization module 502 performs joint optimization by using the joint optimization model that is based on server selection and, and obtains output information and sends the output information to the statistics calculating module 503. The statistics calculating module performs statistics collection according to the number of the copies of the to-be-placed media content that is obtained by the information collecting module 501 and the information sent by the joint optimization module 502. The user access statistics obtained by the statistics calculating module 503 are sent to the copy placing module 504. The copy placing module 504 obtains the maximum value of the user access statistics and input the maximum value into the determining module 602. The determining module 602 determines whether the media content corresponding to the maximum value of the user access statistics has remaining copies; if the media content has remaining copies, the determining module 602 feeds back the result to the copy placing module 504 and the copy placing module 504 places the copies of the media content corresponding to the maximum value; if the media content does not have remaining copies, the determining module 602 feeds back the result to the deleting module 601, and the deleting module 601 deletes the obtained maximum value from the user access statistics, feeds back information to the copy placing module to update the maximum value of the user access statistics, and obtains another maximum value and perform a next copy placement process.

In this embodiment of the present invention, optimization and statistics collection and calculation are performed on the network information by using the joint optimization model based on server selection and traffic engineering to obtain the user access statistics of the to-be-placed media content. The copies of the media content are placed on the cache device with large user access statistics so that the delay in user's accessing the media content is shortened and the generated traffic is reduced. This improves the user's delay experience and improves the network utilization rate.

Persons of ordinary skills in the art should understand that all or part steps of the preceding methods can be implemented by hardware following instructions of programs. The programs may be stored in a computer readable storage medium. The storage medium may be a read only memory (ROM), a magnetic disk, or a compact disc-read only memory (CD-ROM).

Detailed above are the method and apparatus for controlling data storage provided in the embodiments of the present invention. Persons of ordinary skills in the art can make modifications or variations to the embodiments and application without departing from the idea of the embodiments. The description is not intended to limit the present invention.

What is claimed is:

1. A method for controlling data storage, comprising:
obtaining a number of copies of to-be-placed media content;
inputting user set information, server set information, media traffic demand information, and network topology information that are collected into a joint optimization model based on server selection and traffic engineering to perform joint optimization, and obtaining output information;
performing statistics collection on the output information to obtain user access statistics of the to-be-placed media content on each cache device; and
placing, according to the user access statistics and the number of copies, the copies of the to-be-placed media content so that the copies of the to-be-placed media content are preferentially placed on a cache device with large user access statistics;
wherein the placing, according to the user access statistics and the number of copies, the copies of the to-be-placed media content comprises:
1) traversing the user access statistics of each cache device to obtain a maximum value of the user access statistics;
2) determining whether the media content corresponding to the maximum value of the user access statistics has remaining copies; if the media content has remaining copies, performing operation 3); if the media content does not have remaining copies, deleting the maximum value and performing operation 1);
3) placing the copies of the media content corresponding to the maximum value of the user access statistics on a cache device corresponding to the maximum value of the user access statistics according to the maximum value of the user access statistics, and deleting the maximum value; and
4) repeating operations 1) to 3) until all copies of the media content are placed.

2. The method according to claim 1, further comprising:
if remaining capacity of a cache device is insufficient, stop placing the copies on the cache device.

3. The method according to claim 1, further comprising:
inputting a server bandwidth set and network end-to-end background traffic information that are collected to the joint optimization model that is based on server selection and traffic engineering to perform joint optimization.

4. A method for controlling data storage, comprising:
obtaining a number of copies of to-be-placed media content;
inputting user set information, server set information, media traffic demand information, and network topology information that are collected into a joint optimization model based on server selection and traffic engineering to perform joint optimization, and obtaining output information;
performing statistics collection on the output information to obtain user access statistics of the to-be-placed media content on each cache device; and
placing, according to the user access statistics and the number of copies, the copies of the to-be-placed media content so that the copies of the to-be-placed media content are preferentially placed on a cache device with large user access statistics, wherein the output information comprises:
a cache device policy and a network routing policy;
wherein the cache device policy comprises a policy of a cache device providing services for user selection and a traffic allocation policy of the cache device; and
the network routing policy comprises a policy for selecting a route between the cache device and a user.

5. The method according to claim 4, wherein the performing statistics collection on the output information to obtain the user access statistics of the to-be-placed media content on each cache device comprises:
parsing the policy of the cache device providing services for user selection to obtain correspondence between the user, media content accessed by the user, and a cache device storing the media content;
collecting user access statistics of each piece of media content on each cache device; and
obtaining user access statistics of to-be-placed media content on each cache device.

6. An apparatus for controlling data storage, comprising:
an information collecting module, configured to obtain a number of copies of to-be-placed media content and collect user set information, server set information, network topology information, and media content demand;
a joint optimization module, configured to input the user set information, server set information, media traffic demand information, and network topology information that are collected into a joint optimization model based on server selection and traffic engineering to perform joint optimization, and obtain output information;
a statistics calculating module, configured to perform statistics collection on the jointly optimized output information to obtain user access statistics of the media content on each cache device;
a copy placing module, configured to place, according to the user access statistics and the number of copies, the copies of the to-be-placed media content so that the copies of the to-be-placed media content are preferentially placed on a cache device having large user access statistics;

a deleting module, configured to delete a maximum value of the user access statistics when the media content corresponding to the maximum value of the user access statistics does not have remaining copies; and a determining module, configured to determine whether the media content corresponding to the maximum value of the user access statistics has remaining copies.

7. An apparatus for controlling data storage, comprising:

an information collecting module, configured to obtain a number of copies of to-be-placed media content and collect user set information, server set information, network topology information, and media content demand;

a joint optimization module, configured to input the user set information, server set information, media traffic demand information, and network topology information that are collected into a joint optimization model based on server selection and traffic engineering to perform joint optimization, and obtain output information;

a statistics calculating module, configured to perform statistics collection on the jointly optimized output information to obtain user access statistics of the media content on each cache device;

a copy placing module, configured to place, according to the user access statistics and the number of copies, the copies of the to-be-placed media content so that the copies of the to-be-placed media content are preferentially placed on a cache device having large user access statistics, wherein the statistics calculating module comprises:

a parsing unit, configured to parse a policy of a cache device providing services for user selection to obtain correspondence between a user, media content accessed by the user, and a cache device storing the media content, wherein the policy of the cache device providing services for user selection is contained in a cache device policy and the cache device policy is contained in the output information;

a statistics collecting unit, configured to collect user access statistics of each piece of media content on each cache device; and an obtaining unit, configured to obtain user access statistics of the to-be-placed media content on each cache device.

* * * * *